Aug. 25, 1970   A. C. LEENHOUTS   3,525,917
METHOD AND APPARATUS FOR PRODUCING DIGITAL CONTOUR
MOVEMENT FOR A PLURAL AXES STEPPING MOTOR DRIVE
Filed April 4, 1968   4 Sheets-Sheet 1
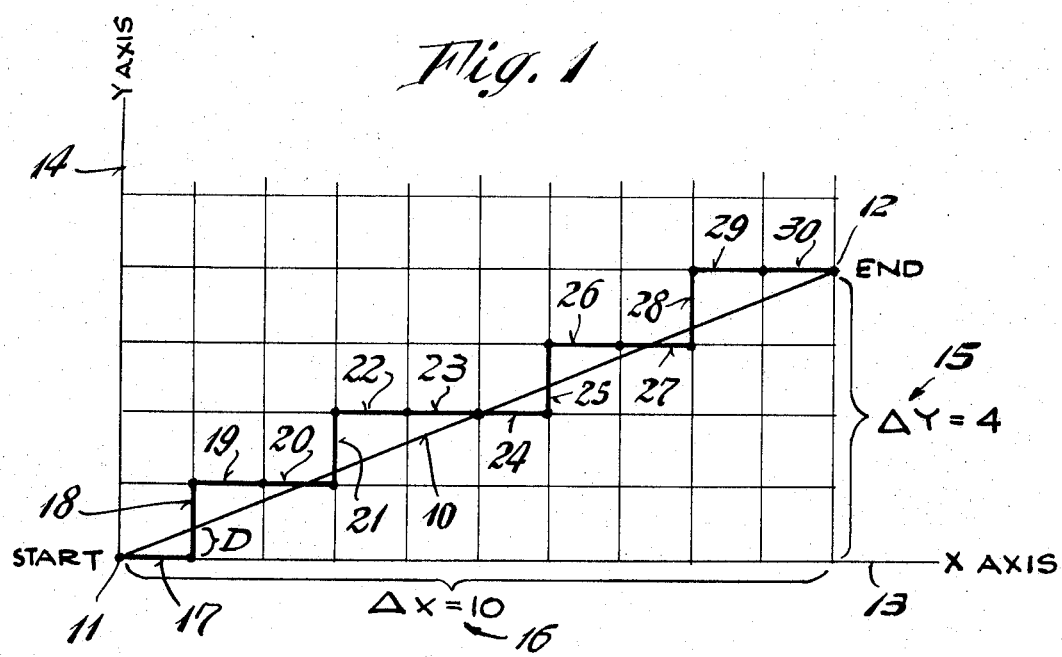
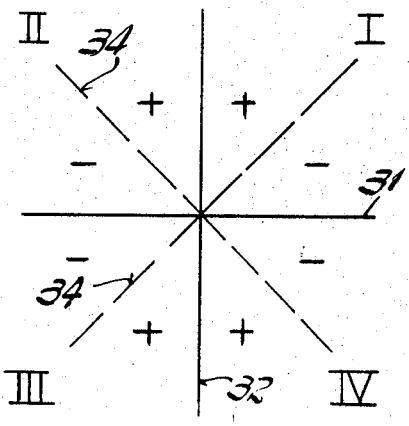
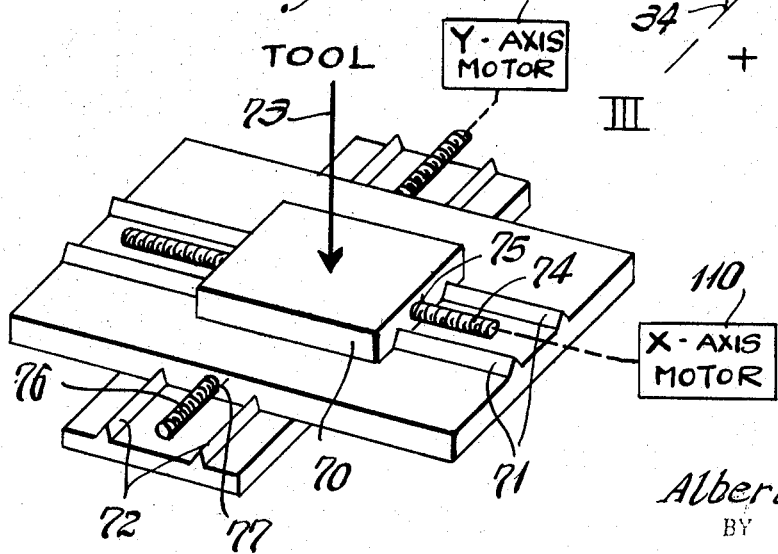
INVENTOR.
Albert C. Leenhouts
BY
Johnson and Kline
ATTORNEYS

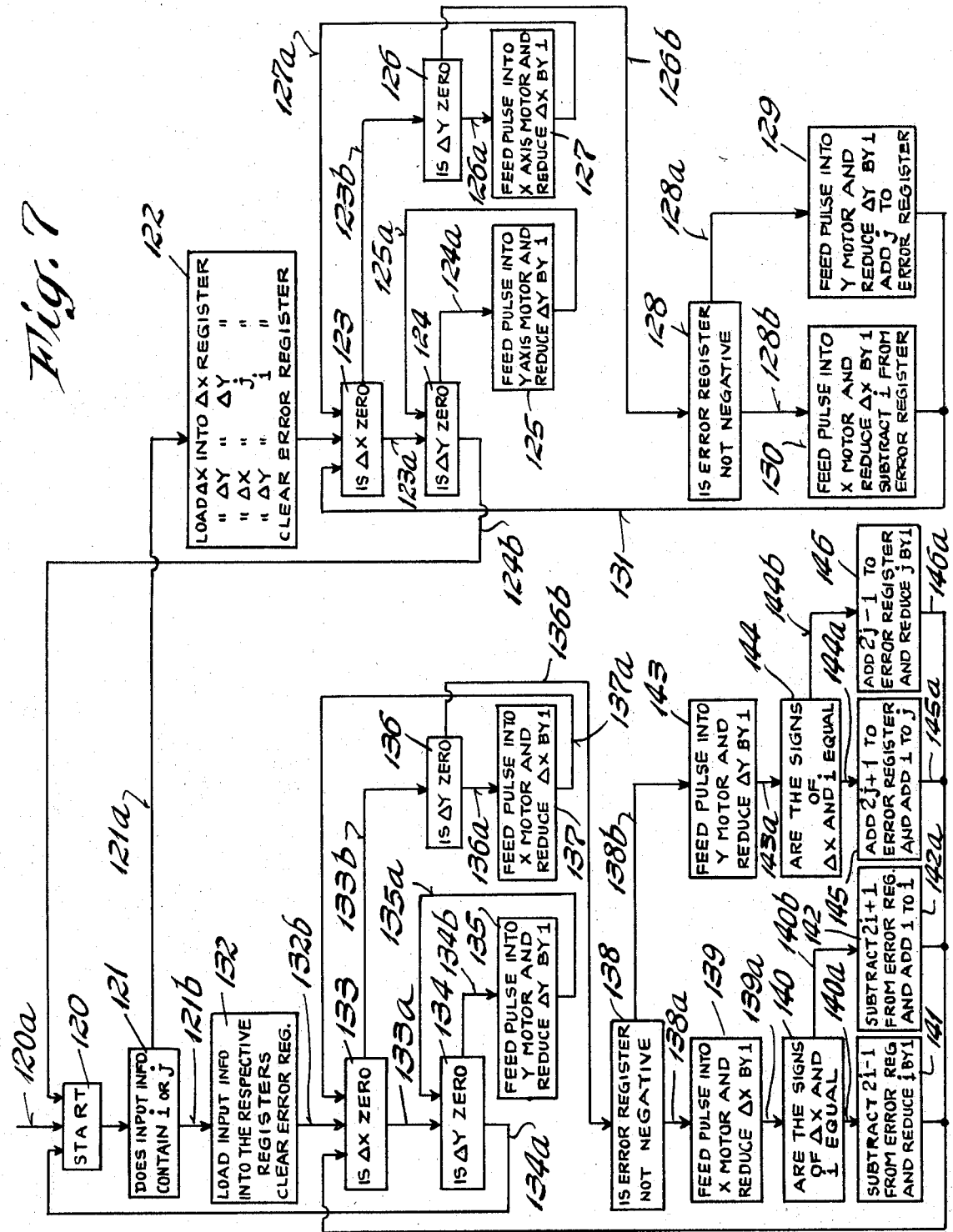

United States Patent Office 3,525,917
Patented Aug. 25, 1970

3,525,917
METHOD AND APPARATUS FOR PRODUCING DIGITAL CONTOUR MOVEMENT FOR A PLURAL AXES STEPPING MOTOR DRIVE
Albert C. Leenhouts, Granby, Conn., assignor to The Superior Electric Company, Bristol, Conn., a corporation of Connecticut
Filed Apr. 4, 1968, Ser. No. 718,725
Int. Cl. G05b 19/24
U.S. Cl. 318—570                                5 Claims

ABSTRACT OF THE DISCLOSURE

A method and apparatus for directing an element movable in two axes that are perpendicular to each other with each axis being operated independently by a stepping motor to produce a linear and/or arcuate desired path of movement of the element by determining the position of the element with respect to the path after each step, taking the next step on the axis which will produce after the step the least deviation from the desired path and continuing to determine and take one step at a time on the axis that will produce the least deviation for the complete extent of the desired path.

---

In U.S. patent application Ser. No. 477,133, filed Aug. 4, 1965 and assigned to the assignee of the present invention, there is disclosed an element or tool, such as a machine bed, that is mounted for movement along an X axis and a Y axis with the axes being perpendicular to each other. A steping motor is connected to each axis to produce movement with the movement on each axis being generally independent of the other and with the movement consisting of one or more steps of the same precise length. Programmed instructions, such as may be coded on punched tape, are introduced into the system which then controls the motors to cause them to move the element the number of steps required by the instructions. The instructions consist basically of the number of steps required along each axis to move from its present location to the next desired location without directing the specific path that the element is to follow in moving to the next desired location.

While such a system has been found extremely satisfactory, it has heretofore been incapable of accepting information which requires the element to move along a specific linear or arcuate path from one location or point to the next. Thus, as heretofore known, both motors would be operable to produce the movement required along each respective axis and then stop. The movement of each was generally independent of the other, occurred simultaneously, and normally was at the same rate so that the element was moved angularly and not linearly between the two points. It will thus be understood that such a system has had limitations which prevented it from accepting commands that required movement of the element along a specifically desired path.

It is accordingly an object of the present invention to provide an apparatus and method which cause in a two-axes system a movement of an element along a path in accordance with programmed information with the movement consisting of a series of steps on the axes.

Another object of the present invention is to achieve a linear movement of an element in any angular direction with instructions that are essentially point-to-point commands in that only the final coordinates of the next desired point are required and which therefore does not require any additional commands or information.

A further object of the present invention is to provide an apparatus and method for effecting movement of an element along an arcuate path in which the only instructions required relate to the final coordinates of the path and its relationship to an arc's center.

Still another object of the present invention is to provide a method for producing linear and arcuate movement of an element using a stepping motor on each axis in which the maximum deviation of the movement will be no more than the movement produced by one step of either motor.

In carrying out the present invention, the method has particular utility when employed with the type of numerically controlled system for a machine tool as disclosed in the above-noted patent application. Such a tool has an element or bed which may carry work and is moved along an X axis and along a Y axis with respect to another part of the tool, such as a milling cutter. The movement for each axis is produced by a stepping motor that, for each change of energization of its windings, moves the element a step of precise length. By controlling the number of changes of energization, the extent of movement of the motor is controlled and as the former is in turn directly related, as by a 1:1 ratio to a signal pulse, the number of pulses thus serves to control the extent of movement.

In the above-noted system, each axis motor will accordingly receive commands that consist of a train of pulses which has a number that is exactly related to the movement desired. Normally there is no relationship existing between the train of pulses for one axis and the train for the other except for the combined movement of both effecting the final positioning of the element at the commanded location.

The present method, while still supplying the number of pulses to each axis motor to produce the movement of the element to the required location provides for controlling each pulse so that only one step on one axis occurs at one time. The axis on which the step is taken is determined prior to the taking of the step by considering where the prior steps have positioned the element with respect to where the instructions have commanded the element to be. In other words, the input instruction sets the desired path and after each step that the element is moved, its position with respect to the desired path is determined. The determination consists of selecting on which axis the subsequent step should be taken in order to move the element with the least deviation from the desired path by considering the relationship between the movement produced by the prior step and the desired path. If the prior step caused a movement which produced a crossing of the desired path then the subsequent step is taken on the other axis from the axis on which the prior step was taken. If, on the other hand, the prior step movement did not cross the desired path, then the subsequent step is taken on the same axis as that on which the prior step was taken. Only one step occurs at a time and a determination is made of whether or not a crossing occurred after each step to control on which axis the next step is to be taken. By such a method, the element will always select the axis for the next step which makes its movement more closely correspond to that commanded by producing the maximum number of crossings of the desired path. Thus, though the movement is a series of rectilinear steps, the actual movement will not deviate from the desired path a distance which is greater than the extent of movement produced by one step.

While the method may be manually followed, there is also disclosed herein an apparatus which utilizes the method for automatically controlling a two-axes system, such as disclosed in the above-noted application. The apparatus accepts the input instructions, stores it and then evaluates after each step on which axis the next step should be taken. After each step, it alters its stored information to maintain it related to the steps to be taken and the steps that have been taken so as to correlate the stored information with the path of movement of the element at each step.

Other features and advantages will hereinafter appear.

In the drawing:

FIG. 1 is a diagrammatic illustration showing a desired linear path of movement and the path of movement achieved by use of the present invention.

FIG. 2 is an illustration showing four quadrants and the signs in the area in each which indicate on which axis a step is to be taken.

FIG. 3 is a diagrammatic representation of an element such as a machine bed, the axes motors and a tool.

FIG. 7 is a sequence chart of the control circuit block utilized in the apparatus.

Figure 4:
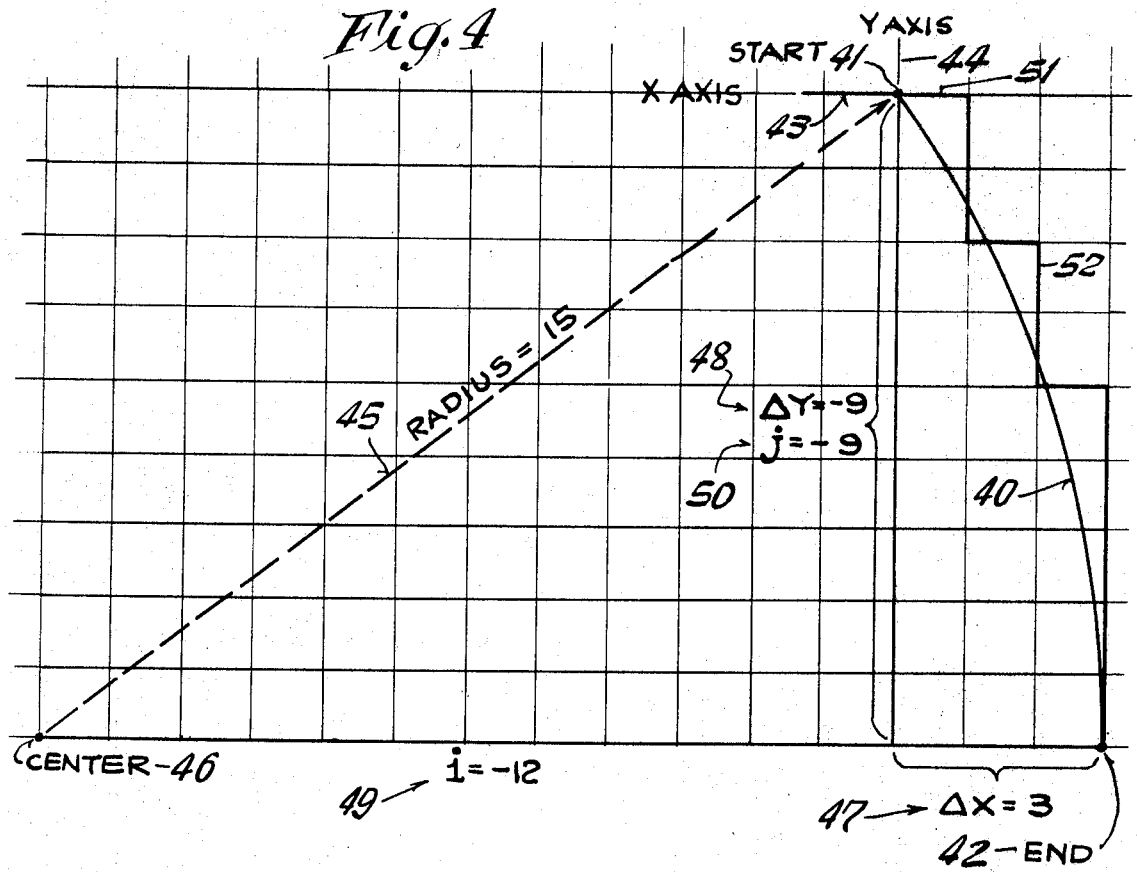
FIG. 4 is a diagrammatic illustration showing a desired arcuate path of movement and the actual path of movement of the element which results from the use of the present invention.

Referring to the drawing, FIG. 1, there is shown a straight line 10 having a start 11 and an end 12. The line is shown positioned with respect to X and Y axes 13 and 14 respectively to extend at an angle with respect thereto. The line 10 is representative of a path of movement which is desired to result from operation of a stepping motor on the X axis and a stepping motor on the Y axis. The movement of each motor along its axis consists of increments of movement or steps with each step having the same precise length for the X axis and for the Y axis with the steps on both axes in the herein described embodiment also being steps of the same length. The distance between the start and end are defined by data along each axis and thus the end 12 is 4 steps from the start in the Y direction (shown as $\Delta Y = 4$ and indicated by the reference numeral 15) and is 10 steps from the start in the X direction (shown as $\Delta X = 10$ and indicated by the reference numeral 16).

This data is the same as required in the point-to-point numerical control type systems, wherein the information required is the distance along the coordinates from the last or present point which is taken as O, i.e. the intersection of the X and Y axis and the end point of the desired movement. For the next movement, the prior end point becomes the present zero point and the distance to the end is given as $\Delta X$ and $\Delta Y$, wherein each is set forth as a number representative of the number of increments of movement.

In order to facilitate an understanding of the movement produced by the present invention in FIG. 1, the coordinates are shown with lines subdividing them into identical squares with each square having a side that is equal to the distance which the motor moves the machine element or bed for each step that it takes as the steps produced by each motor are the same. While the squares are about ½" on a side, it will be understood that in use, the side or step length may be on the order of .001" or .0005" depending on many factors including the mechanical connection between the element and the motors.

The method of the present invention requires that after the command information is supplied, namely the numerical quantities 10 and 4 for the X and Y axes respectively, one of the motors is required to take the first step, it being immaterial on which axis the step is taken except when the desired path coincides with an axis. Selecting the X motor to take the first step, its produced movement is indicated in FIG. 1 by the segment 17. The movement produces a deviation between the actual position of the element and the desired path 10 with the deviation being indicated by the reference letter D. The next step is taken on the other axis namely the Y axis, assuming that again the desired path is not along an axis and is indicated by the segment 18. The present method requires that whenever the deviation at the terminus of a step is below the desired path, line 10, i.e. nearer the X axis coordinate than the path, a Y step must be taken. Another condition is the opposite thereof in that where the last step terminates above the path, the method requires that an X step be taken. As the terminus of segment 18 is above the path, the next step is on the X axis and indicated by the segment 19. This is one manner of determining if a crossing of the desired path occurred by the movement of the prior step because if a crossing had occurred then the terminus would be on the opposite side of the desired path.

As the terminus of segment 19 is above the line 10 (no crossing occurred) an X step is again required as indicated by the segment 20. The terminus of this last step is below the line 10 which requires a Y step 21 (a crossing occurred) and it has its terminus above the line 10. Thus two more X steps, indicated by segments 22 and 23, are directed to be produced by the crossing during the segment 21 and the lack of a crossing by the segment 22.

The terminus of segment 23 coincides exactly with the desired path 10 and as with the first step, an X step is taken whenever there is no deviation, the path and movement coincide. This X step is shown by the segment 24. The terminus of segment 24 is below the line 10 requiring a Y step 25 and then because its terminus is above the line 10, two subsequent X steps 26 and 27 are to be taken. Again the terminus of the segment 27 is below the line, so a Y step, segment 28, is taken and then two X step segments 29 and 30 which places the terminus of the last step or segment 30 exactly at the end 12 of the line 10.

The path traversed by the stepped operation along the X and Y axes does not exactly conform to the desired path 10. However, at no place in the traversed path is the deviation greater than the movement of one step and hence while it may appear in FIG. 1 that the actual path extremely deviates from the desired path, in actual practice where there may be 1000 or 2000 steps in an inch, the deviation is within most acceptable limits. Moreover, if the work carried by the bed is being milled by a circular cutter, the sharpness of the junctions of the steps will be minimized.

In a mathematical analysis of the present method, it will be understood that each X step introduces an error or deviation from the desired path that is equal to $-\Delta Y/\Delta X$ or for the example given $-4/10$. Additionally each Y step produces a deviation which is equal to $\Delta X/\Delta X$ or $10/10$ or 1. After the first step, the deviation D is equal to $-\Delta Y/\Delta X$, after the second step (a Y step) the deviation is equal to $$\frac{-\Delta Y}{\Delta X}+\frac{\Delta X}{\Delta X}$$

after the third step, an X step, the deviation is $$\left(\frac{-\Delta Y}{\Delta X}+\frac{\Delta X}{\Delta X}+\frac{-\Delta Y}{\Delta X}\right)$$

The deviation at the end of any step is accordingly the sum of the individual deviations for each of the steps taken.

The exact deviation after any number of steps can accordingly be determined from the formula $$\Sigma_d = N\left(\frac{-\Delta Y}{\Delta X}\right)+M\left(\frac{\Delta X}{\Delta X}\right)$$

where N is the number of X steps taken and M is the number of Y steps taken. At the end of the desired linear movement, N and M are numerically equal to $\Delta X$ and $\Delta Y$ and hence the equation reduces to 0, showing no deviation.

When the formula is reduced, it becomes $$\Sigma_d = \frac{N(-\Delta Y)+M(\Delta X)}{\Delta X}$$

If $\Delta X$ is not 0 (zero requiring a movement exactly on the Y axis) the equation may be reduced further in order to practice the method of the present invention by eliminating the denominator $\Delta X$ so that it becomes $$\Sigma_d \approx N(-\Delta Y)+M(\Delta X)$$

The present method interrogates the sum $\Sigma_d$ after each step to determine whether or not it is 0 and if not, what is its sign (i.e. + or −). By following the above rules of taking an X step when $\Sigma_d$ is 0 or + and a Y step when it is −, the actual deviation cannot exceed the distance represented by more than one step. Thus the present invention uses only the sign of the sum $\Sigma_d$ and not its numerical value which not only decreases the manual calculations required but also simplifies an apparatus that employs the method since it eliminates the necessity of determining the actual numerical quantity of deviation.

It will be understood that if after a step, the sign of the total deviation is the same as prior to the taking of a step, that a crossing did not occur. Conversely, if the signs are different, i.e. changed by the movement of the step, then a crossing had occurred. Instead of comparing signs however the present methods functions by taking an X step whenever the total deviation is + and a Y step whenever the total deviation is −, which produces the same effect.

In the example given above with respect to FIG. 1, where $\Delta X=10$ and $\Delta Y=4$, the following is a numerical tabulation resulting from using the formula and the interpretation of the results of the sign of the formula:

| Step No. | X step | Y step | $\Sigma_d$ | Next step |
|---|---|---|---|---|
| 1 | V |   | 1(−4)+0 or − | Y |
| 2 |   | V | 1(−4)+1(10) or + | X |
| 3 | V |   | 2(−4)+1(10) or + | X |
| 4 | V |   | 3(−4)+1(10) or − | Y |
| 5 |   | V | 3(−4)+2(10) or + | X |
| 6 | V |   | 4(−4)+2(10) or + | X |
| 7 | V |   | 5(−4)+2(10) or 0 | X |
| 8 | V |   | 6(−4)+2(10) or − | Y |
| 9 |   | V | 6(−4)+3(10) or + | X |
| 10 | V |   | 7(−4)+3(10) or + | X |
| 11 | V |   | 8(−4)+3(10) or + | Y |
| 12 |   | V | 8(−4)+4(10) or + | X |
| 13 | V |   | 9(−4)+4(10) or + | X |
| 14 | V |   | 10(−4)+4(10) or 0 | END |

A comparison of the above table with the path consisting of segments 17–30 shows identicalness as to the sequence of steps taken. Thus the method can be performed either visually, by determining if the tool and path crossed, or mathematically as shown by the above table.

Referring to FIG. 2, there is shown the four quadrants of a circle with the X axis 31 and the Y axis 32 being indicated and extending at right angles to each other. The example given in FIG. 1 would be applicable to the I quadrant (denoted I) and the sign nearest the X axis is − while the sign nearest the Y axis is +. This relationship is also true in the other three quadrants as shown by the location of the signs with respect to diagonals 33 and 34. It will be understood that the start of the desired line or path of movement is to be considered as beginning at the center of the intersection of the two axes and proceeding outwardly therefrom so that in all four quadrants I, II, III and IV, each step increases the value of N or M by 1. It is also noted that the values of $\Delta X$ and $\Delta Y$ are always considered to be positive in the formula even though in the above-noted numerical control system, movement leftward and downward is generally considered to be − or negative coordinates.

Shown in FIG. 4 is the application of the method of the present invention to the controlling of the stepping movements to produce a path of movement that corresponds to an arc and which deviates from a true arc by a distance which is no more than that produced by one step. The arc that is commanded is indicated by the reference numeral 40 and has a start 41 and an end 42. The intersection of the X axis 43 and the Y axis 44 is shown and corresponds with the start 41. In this example, the arc 40 has a radius 45 of 15 steps from a center 46 and the center and the end are both on the X axis. The value of $\Delta X$ is 3 (reference numeral 47); $\Delta Y=-9$ (reference numeral 48); $i=-12$ (reference numeral 49) and $j=9$ (reference numeral 50). The characters $i$ and $j$ are the X and Y coordinates respectively of the center 46 from the start 41 of the arc. This information of four values is all that is required in order to control the movement of the element that is to follow the arc. It will be noted that $i$ and $j$ are negative because they indicate that the center 46 is located leftwardly and downwardly from the start 41. Also $\Delta X$ is positive because the movement is to be rightwardly of the start while $\Delta Y$ is negative because it is a downward movement.

The start 41 is a distance from the center which is equal to the square root of $i^2+j^2$. As in the linear movement example, the first step taken is arbitrarily selected to be an X step which is indicated by the segment 51. The terminus of line 51 is a distance from the center 46 which is equal to the square root of $(i+1)^2+j^2$ by reason of the right triangle relationships and its deviation from the arc 40 is its difference in length from the radius 45. As the present invention only utilizes the sign or direction of deviation, the square roots can be neglected and the values of the squares compared to determine which is larger. Thus $(i^2+j^2)-[(i+1)^2+j^2]$ is indicative of the amplitude of the deviation and the sign of the deviation will show on which side of the arc the terminus of the segment 51 is located. The following table shows the steps which occur and the relative deviation between the location of the terminus of the last step from the center with respect to the radius 45. The sign of the relative deviation determines whether the next step will be an X step or a Y step.

If the terminus of the last step is beyond the arc 40, i.e. the arc is between it and the center, then a Y step is to be taken while if the location of the terminus is between the center and the arc, then an X step is to be taken. As in the linear method, if the deviation is 0, path and the terminus coincide, an X step is arbitrarily selected to be taken. The table indicates the quantities at the end of a step and while a numerical quantity is indicated in the error column, its value is not a true numerical quantity of the deviation (except for zero). The $\Delta X$ and $\Delta Y$ quantities are the steps of each remaining to be taken and are decreased numerically by 1 for each step taken. The value of $i$ is increased by −1 for each X step taken (as the terminus moves further from the center) and $j$ is decreased by 1 for each Y step taken because it should be 0 at the end of the movement as the center 46 and the end 42 have the same Y coordinate value. The column $i'^2+j'^2$ is the value resulting from squaring the values in the $i$ and $j$ columns and will change with each step as $i$ and $j$ change. The column "error from $i^2+j^2$" is the difference from the square of the radius (225) less the value of $i'^2+j'^2$. The column "next step" indicates on which axis the next step is to be taken as determined by the sign in the "error column."

the arcuate method performs similarly to the linear but uses the length of the terminus of each step from the center of the arc to determine if a step crossed the path and thus utilizes the quantities $i$ and $j$ with $+$ or $-$ added thereto for each step.

Figure 5:
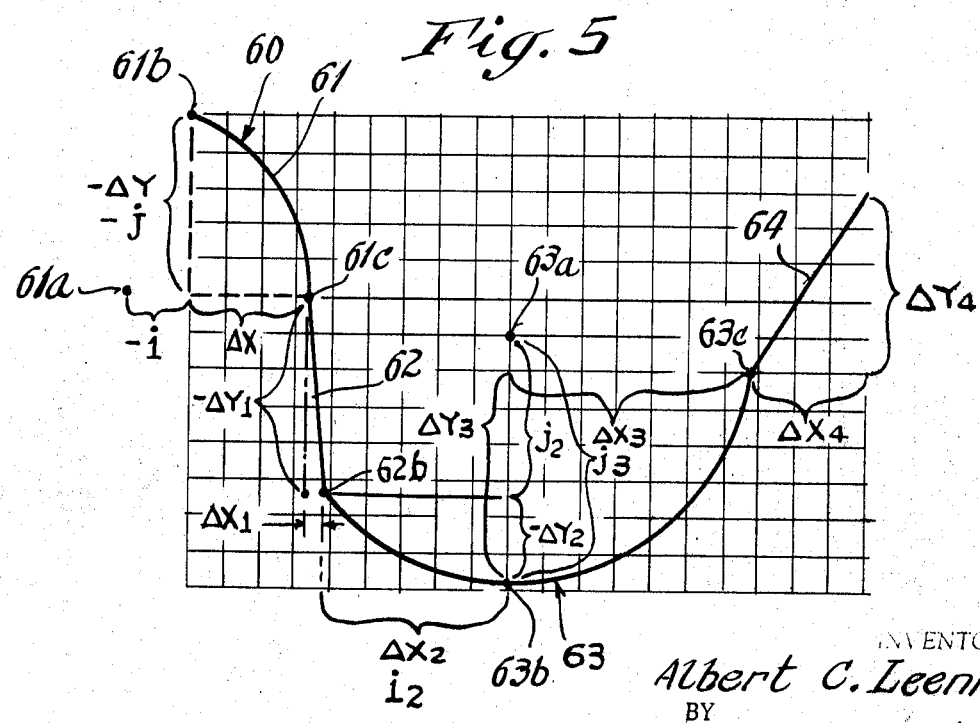
FIG. 5 shows a path having arcuate and linear portions and showing the division of the path into component paths for which the indicated input information is required.

Shown in FIG. 5 is a continuous curve 60 which is composed of an arc 61 having a center 61a, a linear portion 62, an arc 63 having a center 63a and a linear

|   | Steps |    |    |    |     |             | Error from |           |
|---|-------|----|----|----|-----|-------------|------------|-----------|
| X | Y     | ΔX | ΔY | $i$ | $j$ | $i'^2+j'^2$* | $i^2+j^2=(225)$ | Next step |
|   |       |    | −9 | −12 | −9  | 144+81=225 | 0          | X         |
| 1 |       |    | 2  | −9 | −13 | −9          | 169+81=250 | −25       | Y |
|   |       | 1  | 2  | −8 | −13 | −8          | 169+64=233 | −8        | Y |
|   |       | 1  | 2  | −7 | −13 | −7          | 169+49=218 | +7        | X |
| 1 |       |    | 1  | −7 | −14 | −7          | 196+49=245 | −20       | Y |
|   |       | 1  | 1  | −6 | −14 | −6          | 196+36=232 | −7        | Y |
|   |       | 1  | 1  | −5 | −14 | −5          | 196+25=221 | +4        | X |
| 1 |       |    | 0  | −5 | −15 | −5          | 225+25=250 | −25       | Y |
|   |       | 1  | 0  | −4 | −15 | −4          | 225+16=241 | −16       | Y |
|   |       | 1  | 0  | −3 | −15 | −3          | 225+9=234  | −9        | Y |
|   |       | 1  | 0  | −2 | −15 | −2          | 225+4=229  | −4        | Y |
|   |       | 1  | 0  | −1 | −15 | −1          | 225+1=226  | −1        | Y |
|   |       | 1  | 0  | 0  | −15 | 0           | 225        | 0         | END |

* At end of each step.

The actual movement resulting from taking the above steps is shown in FIG. 3 and indicated by the reference numeral 52. It includes 3 X steps as shown by the horizontal portions of the line 52 and 9 Y steps combined into 3 vertical portions. As in FIG. 1, the squares are included with the side of each square being equal to a step. From a consideration thereof, it will be appreciated that even with an arc, the maximum deviation is no more than the length of a step. Moreover, as in the linear embodiment, since the first step was an X step, the second step is a Y step in view of the first step inherently producing an error sign which requires a Y step.

The manner of determining the sign of the error is based upon the computations that each X step increases the error deviation by an amount of $(2i+1)$ as derived from the substraction of $(i^2+j^2)-[(i+1)^2+j^2]$, while each step in the Y direction decreases the error deviation by $(2j-1)$ as derived from $(i^2+j^2)-[i^2-(j-1)^2]$. If $(2i+1)$ is subtracted for each X step and $(2j-1)$ is added for each Y step, a total will result which will be either zero or greater or less, that is have a $+$ or $-$ sign. The value of the quantity is not significant as only the sign is used to indicate the direction of the deviation. Moreover, either $i$ or $j$ will change with each step and not remain constant as indicated by the table.

The movement in FIG. 3 has been assumed to be in the fourth quadrant from the start 41. For movements in other quadrants, the signs of the four coordinates will depend on the direction from the start as explained in connection with FIG. 2. Thus whenever the center of the arc is positioned leftwardly of the start, (as in the example) the sign of the symbol $i$ is $-$ and conversely if the center is to the right, the sign is $+$. As to the symbol $j$, if it is located so that the center is below or down from the start, its sign is $-$ while if the center is above, it is $+$. An X step that is in the direction away from the center will always numerically in absolute value increase $i$ for each X step and a step towards the center will decrease the absolute numerical value of $i$ by one step. Thus if ΔX is of the same sign as $i$, then $i$ is decreased by 1 for each step while if they are of opposite sign, $i$ is increased by 1. For $j$, its change in absolute value is determined by the relative signs of $i$ and ΔX so that for each Y step taken, $j$ is increased by 1 when $i$ and ΔX signs are identical and decreased by 1 when they are opposite.

As will be appreciated from a consideration of the steps taken, whenever a step produces movement which effects a crossing of the desired path, the sign of the deviation will change. However, as in the explained linear movement, rather than attempt to compare the deviation signs prior to and after a step, the same effect is achieved by noting what the sign is after a step. Thus portion 64. The information required in order to move the machine element along the curve 60 is also shown on this figure. The arc 61 has a start 61b and an end 61c with the arc being defined by the increments ΔX, −ΔY, −$i$ and $j$ (which is the same as ΔY). The next part of the curve is a linear portion 62 with its increments being ΔX$_1$ and −ΔY$_1$ from end 61c to its end 62b. The information for the arc 63, the next part of the curve is required to be supplied as two different arcs as the present system is is only capable of defining an arc which is less than 90° and which cannot extend beyond a quadrant, that is have a reversal of direction with respect to either axis. For the first part of the curve 63, from its start 62b to a point 63b, which is on the Y axis of the center 63a, the information consists of ΔX$_2$, −YΔ$_2$, $i_2$ and $j_2$. The remaining part of the arc 63 from the point 63b to the end 63c requires the information of ΔX$_3$, ΔY$_3$, $i_3$ (which is 0 as the point 63b is on the X coordinate of the center 63a) and $j_3$. For the linear portion 64, the only information required is ΔX$_4$ and ΔY$_4$.

It will thus be understood that the complex curve shown in FIG. 4 requires a relatively small quantity of information in order to follow the method of the present invention. This is particularly advantageous when the information is stored on a medium and automatically read, such as by use of a tape reader and punched tape. Moreover, such information required is essentially no more than that normally required to define the curve and thus may be easily computed when the curve is defined during drafting.

In FIG. 3 there is diagrammatically shown a machine tool bed 70 that is slidable on guides 71 in an X direction and slidable on guides 72 in a Y direction with respect to a tool 73. An X axis motor 110 is connected to a threaded shaft 74 that cooperates with a nut 75 on the bed 70 to linearly move it on the X axis when the motor 110 is energized. Similarly a Y axis motor 111 is connected to a threaded shaft 76 that cooperates with a nut 77 carried by the bed 70 to effect Y axis movement when the motor is energized.

Figure 6:
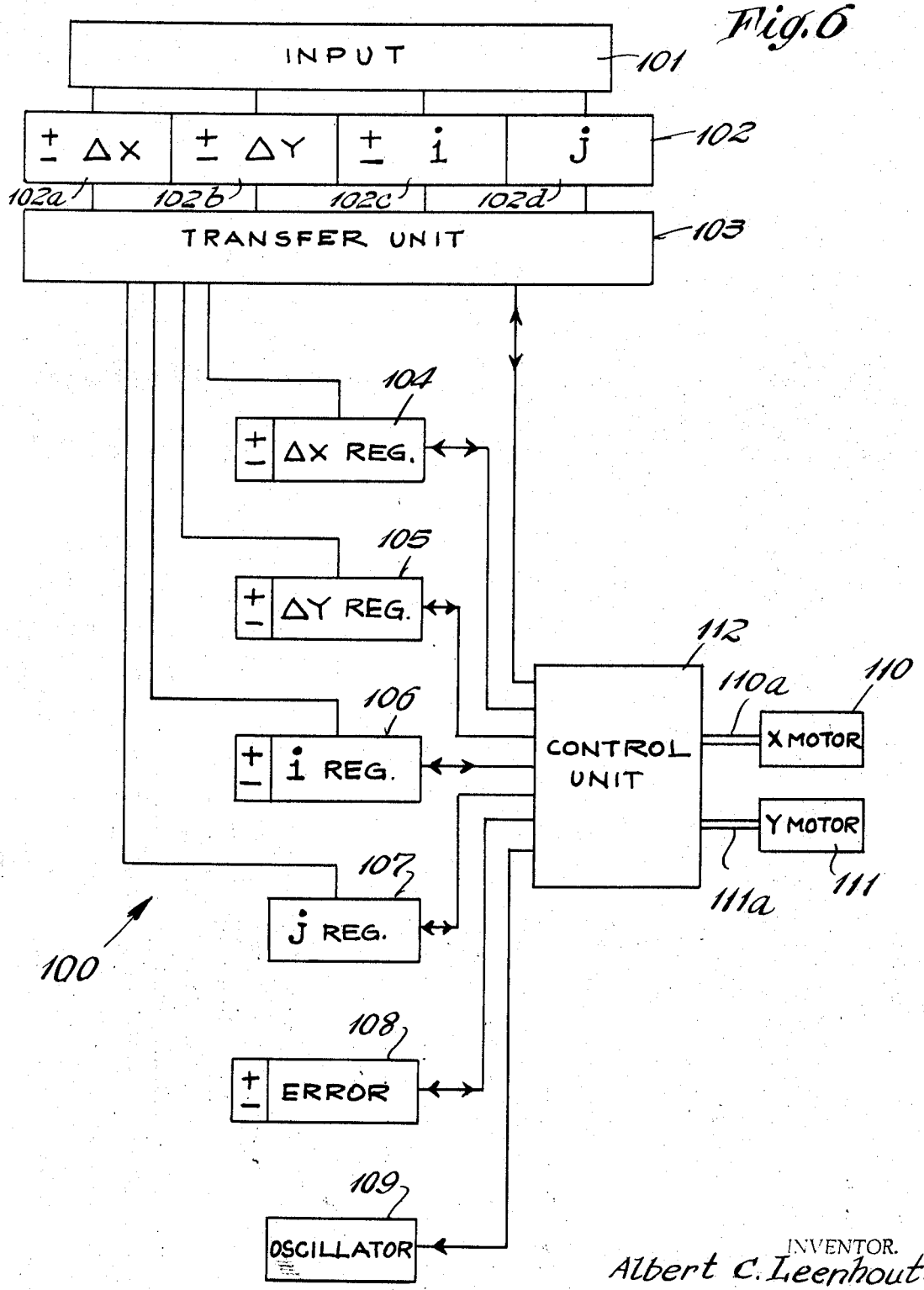
FIG. 6 is a block diagram of an apparatus for automatically performing the method of the present invention.

While the above-noted method may be used when the X and Y axes are stepped manually, shown in FIG. 6 is a block diagram of a system which enables the input information to be obtained from a storage medium such as punched tape and utilized to automatically operate the X and Y axis motors.

The apparatus is generally indicated by the reference numeral 100 and includes an input block 101 which may be the output of a tape reader that reads the input information or commands from a punched tape or may be a manual input in that the operator sets dials or switches which indicate the quantity for each of the input items. The information is then transferred into a storage unit 102 which includes a block 102a for containing, as indicated, the quantity of ΔX and its sign; a block 102b for containing the quantity of ΔY and its sign; a block 102c containing the quantity of i and its sign and a block 102d for containing the quantity of j and as its sign is determined by the signs ΔX, ΔY and i, its sign is not stored. Each block may be a binary coded decimal unit with the signs being represented by the state of a flip-flop. Upon command the information stored in the storage unit 102 is transferred by a transferring unit 103 into subsequent appropriate blocks, as will be hereinafter described.

A block 104 is denoted ΔX REG with + or − signs and is essentially a down counter in that it can be set to the quantity of ΔX in the storage block 102a and then reduces its count by one count for each pulse applied to the X axis motor. A block 105 denoted ΔY REG performs the same function as the block 104 for the ΔY axis and is of the same construction as the block 104. A block 106 is denoted i REG with + and − signs and is essentially and up-down counter in that it may count in either direction for each pulse it receives after being set to a particular quantity. The block 107 is denoted a j register and is also essentially an up-down counter.

The block 108 is denoted the error register with appropriate blocks for the signs and is an up-down counter that for each pulse may change its count one unit or a number of units. A block 109 is denoted oscillator and is used to supply the pulses in the system when actuated at a set rate.

There is also shown a block 110 denoted X motor and a block denoted Y motor 111. The X motor is connected to the machine element to drive the element along the X axis upon receipt of a pulse and the Y motor performs the same function for the machine element along the Y axis. The X and Y motor blocks 110 and 111 are connected to a control unit block 112 by a pair of lines 110a and 111a respectively. The X and Y motors are identical and will take a step in one direction when a pulse is received by one of its wires 110a and take a step in the opposite direction when a pulse is received on the other wire. Thus the motor is a reversible stepping motor. For a more complete description of its operation in accepting pulses and translating the same into a step, reference is made to U.S. Pat. No. 3,117,268.

The control unit 112 is a logic circuit that monitors the various conditions which may exist in the apparatus and utilizes the information to effect the operation of the motors. While the control unit may take any desired logic circuitry, it is required that it function according to the conditions set forth in the sequence diagram, FIG. 6. In this diagram, there are many blocks and the blocks are indicated by their respective function for ease in explanation rather than by their structure. A start block 120 indicates to the control unit that a movement is to begin by a signal on the lead 120a which may be obtained from a manual start button or from the tape or other source of input information. The control unit then interrogates the registers 102a–102d to determine whether or not the movement is linear or arcuate, by the former not containing either i or j information while the latter contains at least i or j information. If it only has linear input information, i.e. only ΔX and/or ΔY quantities, a signal will appear on the lead 121a indicating that the input information does not contain i or j information and said signal will be transferred to a block 122. This block commands the transfer unit to transfer the ΔX information in block 102a into both the ΔX register and the j register and also ΔY information in block 102b into both the ΔY register 105 and i register 106. In addition a signal is given to clear the error register, namely 108 so that it is set to zero.

Upon this occurring, the registers 104–107 are set to a quantity represented by the input information and a signal is passed to a block 123 which inquires whether or not the ΔX register 104 is zero which indicates that there is to be no movement along the X axis. Assuming this condition, a signal is passed on a lead 123a to interrogating block 124 which inquires if the ΔY register 105 is zero to determine if there is a Y axis movement. Assuming that ΔY is not zero, then the system will feed a pulse along a lead 124a into a block 125 which passes the pulse to the Y axis motor 111 and simultaneously reduces the count of the ΔY register 105 by one unit for each pulse supplied. The supplying of the pulse will produce a signal on a lead 125a back to the block 124 which then inquires if the ΔY register is zero. If not, another pulse is supplied to the block 125 to advance the Y axis motor another step and reduce the ΔY register count by 1. The system will continue supplying pulses until there is an indication from the ΔY register 105 to the block 124 that it has a zero count at which time a signal through a lead 124b will be supplied to the start block 120 to indicate termination of the movement.

On the other hand for the condition where there is just a ΔX movement without a ΔY movement, information is fed from the block 123 through a lead 123b to a block 126 which is assumed in this example to interrogate the ΔY register 105 and find it at a zero count, and thus a signal will appear on a lead 126a to a block 127. The block 127 functions similarly to the block 125 except that it supplies pulses to the X axis motor 110 and reduces the ΔX register 104 by one count for each pulse. After each pulse, through a lead 127a, the ΔY register is questioned whether or not it is zero before the next pulse is supplied. When the ΔY register has a zero count, the information is passed through the block 123 on the lead 123a and as both the ΔX register 104 and ΔY register 105 have a zero count, the signal to the start block will appear on the lead 124b.

In the condition when both ΔX and ΔY are not zero, an indication will appear on the lead 126b to a block 128 which interrogates the error register 108 to determine if it is positive or zero, in other words not negatve and utilizes this information to determine the axis on which the next step will occur. If the error register is negative, it indicates that a Y step must be taken and accordingly, a command on the lead 128a will be introduced to a block 129 which functions to feed a pulse into the Y axis motor 111 and also reduce the count of the ΔY register 105 by 1. Also it will cause the adding of the quantity of j to the error register, with j having the same value as the original quantity of ΔX.

If on the other hand, the error register 108 is not negative, a command appears on the lead 128b to block 130 which performs the same function for the X axis motor, namely feeds the pulse to the X axis motor 110; reduces the ΔX register 104 by a count of 1 and subtracts i from the error register 108, the quantity i being the same as the original quantity of ΔY. Upon completion of the function of either the block 129 or 130 for a pulse, a signal will appear on a lead 131 to the initial block 123 to effect operation of the system for the next pulse in which the control unit interrogates the various quantities of the registers to determine if the remaining ΔX is zero, the remaining ΔY is zero or if both have a count, then the sign of the error register and the effecting of the next step.

When the input information contains a quantity indicated as i or j, then the system is required to perform an arcuate movement and thus a signal will appear on a lead 121b connected to the block 121. This signal will cause a block 132 to perform the functions of ordering the transfer unit 103 to transfer the input information in block 102 into the various corresponding registers and to clear the error register 108 to a zero count. A signal then appears on a lead 132b to a block 133 which interrogates whether or not the ΔX register 104 has a zero count. If it is zero, then the information is passed on lead 133a to a block 134 which interrogates whether or not ΔY register has a zero count. If this is true, then no movement is required and a signal will appear on a lead 134a to the start block 120 to indicate that both ΔX and ΔY are zero and to proceed to the next ordered movement.

In the condition where ΔX is zero, but ΔY is not zero, the information appears on a lead 134b to a block 135 which commands the feeding of a pulse into the Y axis motor 111 and the reducing of the count of the ΔY register 105 by a quantity of 1. After this has been accomplished, a completion information appears on a lead 135a which again causes the interrogation by the block 134 of whether or not the count of the ΔY register is zero and if not, the subsequent repetition thereof by the pulsing of the Y motor until a zero count occurs when the information so appears on the lead 134a.

On the other hand if the count of the ΔX register 104 is not zero, an indication appears on a lead 133b to a block 136 which questions whether or not the count of the ΔY register 105 is zero. If it is zero, such an indication ment is complete by a signal on the lead 134a.
to feed a pulse into the X axis motor 110 and reduce the count of the ΔX register 104 by 1 and supply a finish signal through a lead 137a to the block 133. As with the ΔY movement, pulses will be continually supplied until the ΔX register becomes zero. With both ΔX and ΔY registers at a zero count, the system will stop as movement is complete by a signal on the lead 134a.

In the event that neither the ΔX register nor the ΔY register is at a zero count, a signal will appear on a lead 136b which directs a block 138 to question whether or not the error register 108 is not negative, i.e. is either positive or zero. If the error register count is zero or positive, a signal appears on a lead 138a to a block 139 which commands the feeding of a pulse into the X axis motor 110 and the reduction of the count of the ΔX register by 1. Upon this occurring, a signal is passed through a lead 139a to a block 140 which interrogates the ΔX register 104 and the $i$ register 106 to determine if they both have the some sign. Assuming both have the same sign, a signal will appear on a lead 140a to a block 141 which commands the subtraction of the value of $(2i-1)$ from the error register 108 and the reduction of the count of the $i$ register by 1. Upon completion thereof a signal will appear on the leod 141a to the interrogating block 133 to begin the same steps for the next pulse.

If the block 140 senses that the signs of the ΔX and $i$ registers are not the same, a signal will appear on a lead 140b to a block 142 which commands the error register to have $(2i+1)$ subtracted from it and that the quality of 1 be added to the $i$ register 106. With this being accomplished a signal appears on the lead 142a to the block 133 to begin the next step.

In the situation where the block 138 indicates that the error register sign is negative, a signal appears on a lead 138b to a block 143 which commands the feeding of a pulse into the Y axis motor 111 and a reduction of the ΔY register 105 by the count of 1. After this occurring, a signal of its completion appears on the lead 143a to a block 144 which interrogates the signs of the ΔX register 104 and the $i$ register 106 to determine if they are the same or not. If they are the same a signal appears on the lead 144a to a block 145 to command the adding of the quantity $(2j+1)$ to the error register 108 and the adding of 1 to the $j$ register 107. A completion signal will appear on the lead 145a showing that the system is ready for the next step. If the block 144 determines that the signs of the ΔX and $i$ registers are not equal, an indication thereof appears on the lead 144b to a block 146 which commands the adding of $(2j-1)$ to the error register 108 and the reduction of the count of $j$ by 1 in the $j$ register together with the producing a completion signal on the lead 146a to the block 133.

The logic circuit of the control unit may take any desired specific configuration including AND, NOR, OR, etc. gates that a man skilled in the art may construct so long as it performs according to the sequence chart shown in FIG. 7. Such a sequence may if desired add $i\pm\frac{1}{2}$ or $j\pm\frac{1}{2}$ to the error register if found more convenient than $2i\pm1$ or $2j\pm1$ respectively. The various registers are essentially binary counters and may also take any particular form found desirable or convenient.

If both the linear and arcuate paths, the X and Y axes motors will function until the ΔX and ΔY registers have a zero count indicating that the required number of increments of movement have been taken when the motors will cease by reason of carrying out the required movement. Also, the motors are of the reversible type in that an increment of movement may be either forward or reverse with the direction of the movement being dictated by the instructions which set the signs of the ΔX and ΔY registers.

In the herein disclosed embodiment the increment of movement along each axis has been set forth as being equal, the motors are preferably equal and the interconnections with the bed the same so that each when operating at the same speed, i.e. steps per second, will provide the same linear speed of the bed 70. This has been found especially advantageous when the apparatus is used with a milling cutter as the number of increments of movement per second may be adjusted to that most desirable without consideration of the path as the speed to the cutting tool will remain essentially constant irrespective of which axis the movements occur within a range of $\pm 20\%$.

It will accordingly be understood that there has been disclosed a method and apparatus for moving an element along a linear or arcuate path by incremental movements on an X axis and a Y axis. Both utilize the step of determining the relationship of the actual path after each increment of movement prior to taking the next increment. The determination consists of resolving the terminus of the increment of movement with respect to the actual path which then sets the axis on which the next increment of movement is to occur by selecting that axis which will at its terminus provide the least deviation, the apparatus and method employ only the relative position of the terminus with respect to the actual path so that if a terminus of each increment is on one side of the path, increments will appear on the axis that will reduce the deviation continually until a crossing of the desired path by the actual path occurs. After a crossing, the next increment of movement is taken on the axis other than the one which produced the crossing. In this manner, the actual path will cross the desired path the maximum number of times to thereby prevent the deviation of the actual path from being more than one increment of movement.

Variations and modifications may be made within the scope of the claims and portions of the improvement may be used without others.

I claim:

1. An apparatus for producing movement of an element substantially along a desired path by increments of movement along a first and second perpendicular axes with the increments of movement occurring sequentially comprising an element mounted for movement along the first and second axes, a first stepping motor connected to the element for moving said element an increment of movement along the first axis for each change of energization received thereby, a second axis stepping motor connected to the element for moving said element an increment of movement along the second axis for each change of energization received thereby, each of said stepping motors being controllable to produce an increment of movement in one direction or the other for each change of energization, means for receiving information of the desired path with said information including at least two separate numbers indicating the number of increments of movement in the distances from the start of the path to the end of the path along the first and the second axes with the direction of movement along the axes being algebraically indicated, at least two counting registers, means for causing one counting register to assume a condition representing one of the numbers and for storing its algebraic sign and for causing the other counting register to assume a condition representing the other number and its algebraic sign, an error register, means for causing the error register to add a representation of the error produced by an increment of movement along the first axis and to subtract a representation of the error produced by an increment of movement on the second axis, means for sensing the algebraic count of the error register prior to producing each increment of movement, means for directing a change of energization to one of the stepping motors to produce an increment of movement in accordance with the alegbraic count of the error register and means for using the algebraic indication of the information in the counting register to control the direction of movement of the motor to which the change of energization is directed.

2. The invention as defined in claim 1 in which the desired path is an arc of a circle having a center, in which the information receiving means receives information that includes a third number representing the distance along one axis of the center from the start of the path in increments of movement with an algebraic sign indicating the direction and a fourth number representing the distance along the other axis of the center from the start of the path in increments of movement, a third and a fourth counting registers, means causing the third counting register to assume a condition representative of the third number and its algebraic sign and for causing the fourth register to assume a condition representing the fourth number and in which the means for causing the representation to be added to the error register includes means for changing the value of the representation in accordance with the algebraic signs in the counting registers.

3. The invention as defined in claim 2 in which the last named changing means includes means for altering the value of the representation for each increment of movement.

4. The invention as defined in claim 3 in which the error register has a count of zero when the path of movement coincides with the desired path, in which a change of the algebraic sign of the error register count indicates that the path of movement has crossed the desired path and in which the directing means causes a change of energization to be directed to the second axis stepping motor when the representation of the immediately previous increment of movement on the first axis caused the error register to change its algebraic sign.

5. The invention as defined in claim 4 in which the directing means causes a change of energization to be directed to the first axis stepping motor when the representation of the immediately previous increment of movement on the first axis caused the sign of the error register to remain the same.

References Cited

UNITED STATES PATENTS

| 2,833,941 | 5/1958 | Rosenberg et al. | 318—39 X |
|---|---|---|---|
| 2,996,348 | 8/1961 | Rosenberg. | |
| 3,416,056 | 12/1968 | Motooka et al. | |
| 3,422,325 | 1/1969 | Gerber et al. | |

THOMAS E. LYNCH, Primary Examiner

U.S. Cl. X.R.

318—162, 574, 138